US007883096B2

(12) United States Patent
Katz et al.

(10) Patent No.: US 7,883,096 B2
(45) Date of Patent: Feb. 8, 2011

(54) TOOL CONTAINER ASSEMBLY WITH SLIDING DOOR

(75) Inventors: Amir Katz, Bat-Heffer (IL); Gil Vilkomirski, Ein Vered (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 187 days.

(21) Appl. No.: 12/125,599

(22) Filed: May 22, 2008

(65) Prior Publication Data

US 2009/0288970 A1 Nov. 26, 2009

(51) Int. Cl.
*B62B 1/12* (2006.01)

(52) U.S. Cl. .............. 280/47.26; 280/47.18; 280/47.19; 206/373

(58) Field of Classification Search .............. 280/47.19, 280/47.18, 47.26; 220/4.31; 312/107, 108, 312/109; 206/373
See application file for complete search history.

(56) References Cited

U.S. PATENT DOCUMENTS

| | | | | |
|---|---|---|---|---|
| 1,597,092 | A * | 8/1926 | McTighe | 220/812 |
| 2,964,328 | A * | 12/1960 | Muir | 280/47.19 |
| 4,629,202 | A | 12/1986 | Nelson et al. | |
| 4,832,193 | A * | 5/1989 | Kime | 206/372 |
| 4,848,782 | A | 7/1989 | Schmidt | |
| D311,622 | S | 10/1990 | Swig | |
| 5,207,723 | A * | 5/1993 | Newby, Sr. | 312/249.11 |
| 5,213,351 | A * | 5/1993 | Chen | 280/47.19 |
| 5,244,265 | A * | 9/1993 | Chiang | 312/107 |
| 5,378,005 | A * | 1/1995 | Norton | 280/47.26 |
| 5,551,562 | A | 9/1996 | Beretta | |
| 5,634,649 | A * | 6/1997 | Breining et al. | 280/47.35 |
| 5,799,958 | A * | 9/1998 | Bishop | 280/47.26 |
| 5,823,337 | A | 10/1998 | Yunger et al. | |
| 5,893,572 | A * | 4/1999 | Parks | 280/47.18 |
| 6,036,203 | A | 3/2000 | Tyus et al. | 280/47.26 |
| 6,086,073 | A | 7/2000 | Tisbo et al. | |
| 6,170,839 | B1 * | 1/2001 | Kizewski | 280/47.26 |
| 6,176,559 | B1 * | 1/2001 | Tiramani et al. | 312/108 |

(Continued)

FOREIGN PATENT DOCUMENTS

DE 88 08 848 U1 8/1988

(Continued)

OTHER PUBLICATIONS

Extended European Search Report issued for EP Patent Application No. 09160900.8, dated Sep. 22, 2009.

*Primary Examiner*—Jeffrey J Restifo
(74) *Attorney, Agent, or Firm*—Pillsbury Winthrop Shaw Pittman LLP

(57) ABSTRACT

A tool container assembly includes a container, rollers, a handle, and a slidable closure member. The container includes an upper and a lower storage space therein, a rear wall, opposing side walls, a lower front wall and a front opening above the lower front wall. The front opening generally lies along a plane that extends away from the rear wall as it extends downwardly. The slidable closure member is slidably movable between a first position wherein it substantially covers the front opening and a second position wherein it exposes the front opening. The closure member moves to a position wherein it generally lies between the plane and the lower front wall, and at an angle with respect to the plane, when it is moved to the second position.

35 Claims, 12 Drawing Sheets

U.S. PATENT DOCUMENTS

| | | | | |
|---|---|---|---|---|
| 6,347,847 | B1 * | 2/2002 | Tiramani et al. | 312/108 |
| 6,601,930 | B2 * | 8/2003 | Tiramani et al. | 312/108 |
| 6,651,792 | B1 | 11/2003 | Kuwayama | |
| 6,761,368 | B2 | 7/2004 | Carter | |
| 6,877,752 | B2 | 4/2005 | Edwards | |
| 7,114,629 | B2 | 10/2006 | Panek, Jr. | |
| 7,232,018 | B1 | 6/2007 | Salander | |
| 7,273,139 | B2 | 9/2007 | Lantz | |
| 7,275,641 | B1 * | 10/2007 | Purnell | 206/373 |
| 7,338,054 | B2 * | 3/2008 | Pint | 280/79.2 |
| 7,367,571 | B1 * | 5/2008 | Nichols | 280/47.18 |
| 7,503,569 | B2 * | 3/2009 | Duvigneau | 280/47.18 |
| D596,367 | S * | 7/2009 | Katz | D34/19 |
| 2003/0168461 | A1 | 9/2003 | Richardson | |
| 2005/0167221 | A1 | 8/2005 | Mohr et al. | |
| 2005/0199459 | A1 | 9/2005 | Harvey | |
| 2005/0218142 | A1 | 10/2005 | Finnestad et al. | |
| 2006/0000681 | A1 | 1/2006 | Barker et al. | |
| 2006/0006177 | A1 | 1/2006 | Clark et al. | |
| 2007/0209894 | A1 | 9/2007 | Selvi | |

FOREIGN PATENT DOCUMENTS

| | | |
|---|---|---|
| EP | 0 360 987 A1 | 4/1990 |
| GB | 922870 | 4/1963 |

* cited by examiner

TOOL CONTAINER ASSEMBLY WITH SLIDING DOOR

BACKGROUND OF THE INVENTION

Field of the Invention

The present invention relates to a tool container assembly, and, more particularly to a tool container assembly with a slidable closure member that is slidably movable between a first position in which it substantially covers a front opening and a second position in which it exposes the front opening.

Numerous tool container assemblies are known in the art. However, there is a constant need in the industry to improve upon existing tool container assemblies by making them more efficient, mobile, and/or multi-functional.

SUMMARY OF THE INVENTION

One aspect of the invention relates to a tool container assembly. The tool container assembly includes an upper container, a lower container, rollers, a handle and a slidable closure member. The upper container includes an upper storage space therein and the lower container includes a lower storage space therein. The lower container also includes a rear wall, opposing side walls, a bottom wall, a lower front wall, and a front opening above the lower front wall. The front opening generally lies along a plane that extends away from the rear wall as it extends downwardly. The rollers are constructed and arranged to enable rolling transport of the tool container assembly. The handle is operatively connected to the tool container assembly to facilitate tilted rolling transport of the tool container assembly. The slidable closure member is slidably movable between a first position wherein it substantially covers the front opening and a second position wherein it exposes the front opening. The closure member moves to a position wherein it generally lies between the plane and the lower front wall, and at an angle with respect to the plane, when it is moved to the second position.

Another aspect of the invention relates to a tool container assembly. The tool container assembly includes a container, rollers, a handle and a slidable closure member. The container includes a storage space therein. The container also includes a rear wall, opposing side walls, a bottom wall, a lower front wall, and a front opening above the lower front wall. The front opening generally lies along a plane that extends away from the rear wall as it extends downwardly. The rollers are constructed and arranged to enable rolling transport of the tool container assembly. The handle is operatively connected to the tool container assembly to facilitate tilted rolling transport of the tool container assembly. The slidable closure member is slidably movable between a first position wherein it substantially covers the front opening and a second position wherein it exposes the front opening. The closure member moves to a position wherein it generally lies between the plane and the lower front wall, and at an angle with respect to the plane, when it is moved to the second position.

Another aspect of the invention relates to a tool container assembly. The tool container assembly includes an upper container, a lower container, rollers, and a handle. The upper container includes an upper storage space therein and the lower container includes a lower storage space therein. The lower container also includes a rear wall, opposing side walls, a bottom wall, a lower front wall, and a front opening above the lower front wall. The front opening generally lies along a plane that extends away from the rear wall as it extends downwardly. The rollers are constructed and arranged to enable rolling transport of the tool container assembly. The handle is operatively connected to the tool container assembly to facilitate tilted rolling transport of the tool container assembly.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
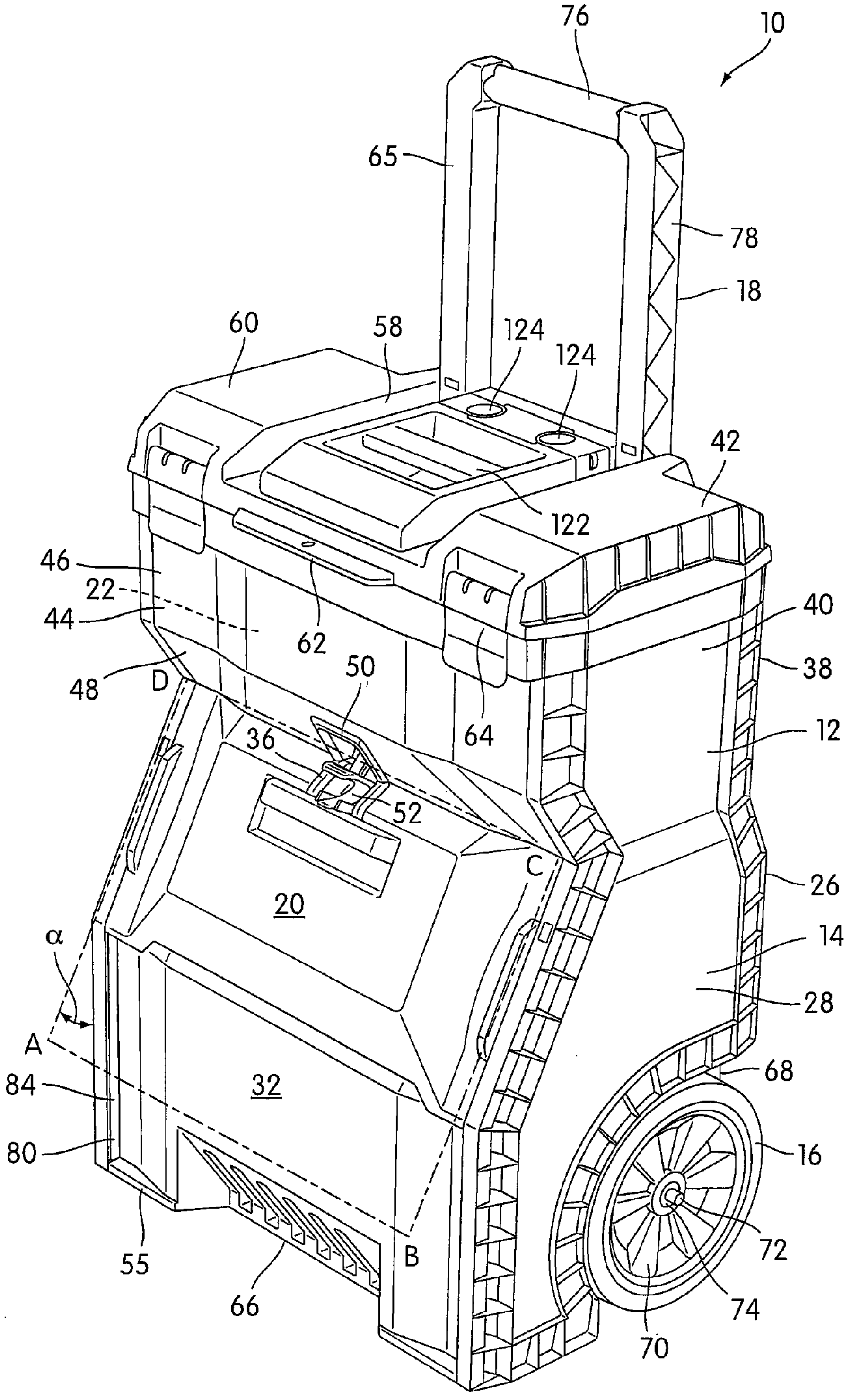
FIG. 1 is a perspective view of a tool container assembly with a slidable closure member, where the slidable closure member is in a first position wherein the slidable closure member substantially covers a front opening in accordance with an embodiment of the present invention.
Figure 2:
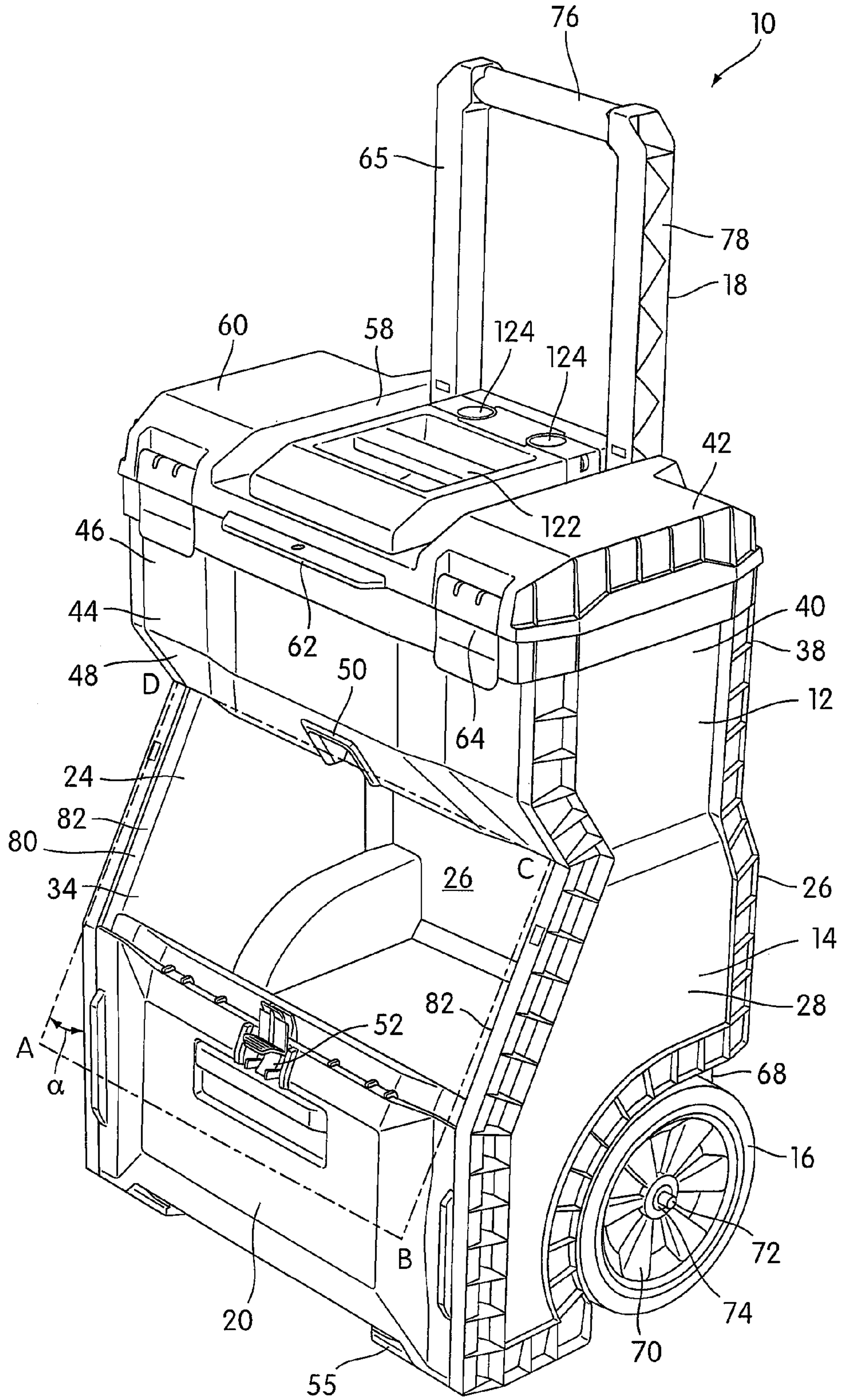
FIG. 2 is a perspective view of the tool container assembly, where the slidable closure member is in a second position wherein the slidable closure member substantially exposes the front opening in accordance with an embodiment of the present invention.

FIGS. 1 and 2 show a tool container assembly 10 in accordance with an embodiment of the present invention. In one embodiment, the tool container assembly 10 may generally include an upper container 12, a lower container 14, rollers 16, a handle 18, and a slidable closure member 20. The upper container 12 includes an upper storage space 22 therein and the lower container 14 includes a lower storage space 24 therein. The lower container 14 also includes a rear wall 26, opposing side walls 28, a lower front wall 32, and a front opening 34 above the lower front wall 32. The front opening 34 generally lies along a plane ABCD that extends away from the rear wall 26 as it extends downwardly. The rollers 16 are constructed and arranged to enable rolling transport of the tool container assembly 10. The handle 18 is operatively connected to the tool container assembly 10 to facilitate tilted rolling transport of the tool container assembly 10. The slidable closure member 20 is slidably movable between a first position wherein it substantially covers the front opening 34 and a second position wherein it exposes the front opening 34. The closure member 20 generally lies within or parallel to the plane ABCD when in the first position and moves to a position wherein it generally lies between the plane ABCD and the lower front wall 32, and at an angle with respect to the plane ABCD, when it is moved to the second position.

FIG. 1 shows the tool container assembly 10 with the slidable closure member 20 in the first position wherein it substantially covers the front opening 34. When the slidable closure member 20 in the first position, a lock assembly 36 is used to lock the slidable closure member 20 in the first position as will be explained in detail with respect to FIGS. 10-15. The tool container assembly 10 can be transported from one place to another by simply tilting and rolling the tool container assembly 10 on rollers 16, such as wheels. FIG. 2 shows the tool container assembly 10 with the slidable closure member 20 in the second position wherein it substantially exposes the front opening 34. When the slidable closure member 20 in the second position, the tool container assembly 10 allows a user to access tools or articles stored in the lower storage space 24 located in the lower container 14 of the tool container assembly 10.

In one embodiment (not shown), it is contemplated that the tool container assembly 10 may only include the lower container 14 having storage space 24 therein, and without the upper container 12 described earlier.

In one embodiment, as shown in FIGS. 1 and 2, the tool container assembly 10, the upper container 12, and the lower container 14 are generally rectangular in shape. However, any convenient shape may be used. The upper container 12 includes a generally vertical (when tool container is standing as shown) rear wall 38, opposing side walls 40, a bottom wall 56 (as shown in FIGS. 10-15), an upper front wall 44, and a cover 42. In one embodiment, the upper front wall 44 may include a first portion 46 and a second portion 48. The first portion 46 may generally be parallel to the rear wall 38, while the second portion 48 may generally lie in a sloping plane that extends towards rear wall 38 as it extends downwardly. In one embodiment, the second portion 48 may include a recess 50 located centrally thereof. The recess 50 is constructed and arranged to allow a latch member 52 attached to the slidable closure member 20 to engage with a latch receiver 54 (as shown in FIGS. 10-15) attached to a wall 56 (as shown in FIGS. 10-15) of the tool container assembly 10, and thus lock or secure the slidable closure member 20 in the first position, as will be discussed later with respect to FIGS. 10-15.

As noted above, the upper container 12 includes the upper storage space 22 therein, which is configured to store tools or articles therein. In one embodiment, the upper container 12 comprises an upwardly facing opening into the upper storage space 22. The cover 42 is constructed and arranged to be pivotally connected the upper container 12 and movable between a closed position wherein it substantially covers the upwardly facing opening and an open position wherein it exposes the upwardly facing opening. In one embodiment, the cover 42 may be connected to the rear wall 38 of the upper container 12 using one or more hinge members or pins (not shown). The cover 42 may be secured in the closed position, as shown in FIGS. 1 and 2, by at least one latch 64 (two are shown). By releasing the latches 64 and unlocking the cover lock assembly, the cover 42 may be pivoted about the hinge members to the open position to access the tools or articles stored in the upper container 12. In one embodiment, support for the cover 42, when placed in the open position, may be provided by surfaces 65 formed on the handle 18. In such embodiment, the handle 18 may be fixed. In another embodiment, the handle 18 can pivot downwardly to be received in a recess in the cover 42.

Specifically cover 42 may include a recess 58 located on a top surface 60. The recess 58 is constructed and arranged to receive a pivotable version of handle 18, when the handle 18 is in a flat, storage or fold-down position, as will be clear from the discussions later. In one embodiment, the cover 42 may include a gripping tab 62 that allows a user to move the cover 42 between the closed position and the open position. In one embodiment, the gripping tab 62 is located on a front edge of the cover 42.

As noted above, the lower container 14 may generally include the rear wall 26, opposing side walls 28, the lower front wall 32, a bottom wall 55 and the front opening 34 above the lower front wall 32. The front opening 34 generally lies along a plane ABCD that extends away from the rear wall 26 as it extends downwardly. In one embodiment, the plane ABCD may generally be at the angle $\alpha$ with respect to the lower front wall 32. In one embodiment, lower portion of the lower front wall 32 may generally define a recess 66 toward a central lower portion thereof. The recess 66 may be formed by a rearwardly and downwardly sloped portion of lower front wall 32 as shown. A recess 68 formed in the lower rear portions of the side walls 28 and the rear wall 26 of the lower container 14 is constructed and arranged to accommodate the rollers 16 therein. In one embodiment, the recess 68 may generally be in the form of an arcuate cut-out.

As noted earlier, the closure member 20 generally lies within or parallel to the plane ABCD when in the first position (as shown in FIG. 1). The closure member 20 then moves to a position wherein it generally lies between the plane ABCD and the lower front wall 32, as will be discussed in detail with respect to FIGS. 6-8. The closure member 20 is at the angle with respect to the plane ABCD, when it is moved to the second position (as shown in FIG. 2).

In one embodiment, the rollers 16 may be in the form of wheels and may facilitate rolling transport of the tool container assembly 10. The rollers 16 are mounted in proximity to a lower region of the lower container 14 so that the tool container assembly 10 may be tilted and pushed along the ground by the user holding the handle 18. The rollers 16, in one embodiment, may optionally be locked against rolling motion by lock members (not shown) to provide a stationary configuration.

Preferably the each wheel 16 is a molded structure reinforced by a plurality of wheel ribs 70 and each wheel 16 is mounted on an end of an elongated axle 72 by two hubs 74 or other appropriate structure. The axle 72 may be an elongated cylindrical metal shaft that is snap fit into rotational engagement with a receiving structure of the lower container 14 in conventional fashion. Alternatively, the axle 72 can be mounted to the tool container assembly 10 through a pair of axially aligned through-holes (not shown) formed in the rear wall 26 of the lower container 14.

In one embodiment, the handle 18 is movable between a storage position (not shown) and an extended position (as shown in FIGS. 1 and 2) to facilitate tilted rolling transport of the tool container assembly 10. In one embodiment, the handle 18 facilitates the user a secure grip by hand grip 76. In one embodiment, the hand grip 76 may include a circular cross-section. In one embodiment, the tool container assembly 10 includes a handle 122 that is enables the user to hold and move the tool container assembly 10, when the handle 18 is in the storage position.

In one embodiment, the handle 18 is constructed and arranged to fold down into a flat, storage position from the extended position. In the flat, storage position, the handle 18 is constructed and arranged to be received into the handle recess 58 formed in the upper surface 60 of the cover 42. In one embodiment, a pair of manually releasable lock members 124 may be selectively released to permit movement of the handle 18 between the flat, storage position. The handle 18 can be releasably lockable in either the folded storage or extended positions. In an alternative embodiment, rather than being foldable, the handle 18 may be constructed and arranged to be linearly movable vertically between a lowered position and an extended position, and optionally locked in either position. The tool container assembly 10 may include a pair of hollow, support legs (not shown) that are configured to telescopically receive legs 78 of the handle 18 to enable such lowering and extension. In one embodiment, the tool container assembly 10 may include a release mechanism (not shown) to lock and release the legs 78 or handle 18 from a locking mechanism. To move the handle 18 up or down, a user may operate the release mechanism to release the legs 78 from the locking mechanism. The locking mechanism may be any suitable mechanism known in the art to restrict movement of a telescopically received tube or rod, such as a tension grip, notch and catch, etc.

The tool container assembly 10 includes the wall 56 (as shown in FIGS. 10-15) of the tool container assembly 10 that forms a ceiling for the lower storage space 24 and a floor for the upper storage space 22. The wall 56 of the tool container assembly 10 is constructed and arranged to separate the upper storage space 22 from the lower storage space 24. In one embodiment, the wall 56 of the tool container assembly 10 is above the front opening 34. In one embodiment, the latch receiver 54 (as shown in FIGS. 10-15) of the lock assembly 36 is attached to the wall 56 of the tool container assembly 10, as will be explained i with respect to FIGS. 10-15.

A guide 80 is disposed generally along the opposite sides of the front of the lower container 14. The guide 80 includes a first (upper) portion 82 and a second (lower) portion 84. The first portion 82 of the guide 80 comprises a pair of guide portions or tracks disposed generally along the opposite sides of the container, specifically on opposite sides of the front opening 34, and generally lies within or parallel to the plane ABCD. The second portion 84 of the guide 80 comprises a pair of guide portions or tracks disposed generally along the opposite sides of the container, specifically on opposite sides of the lower front wall 32, and generally lies in a plane that is parallel to the lower front wall 32. In one embodiment, the guide 80 may generally include a C-shaped or U-shaped cross-sectional configuration. The guide 80 and aforementioned portions thereof generally bound or define the front opening 34.

Figure 3:
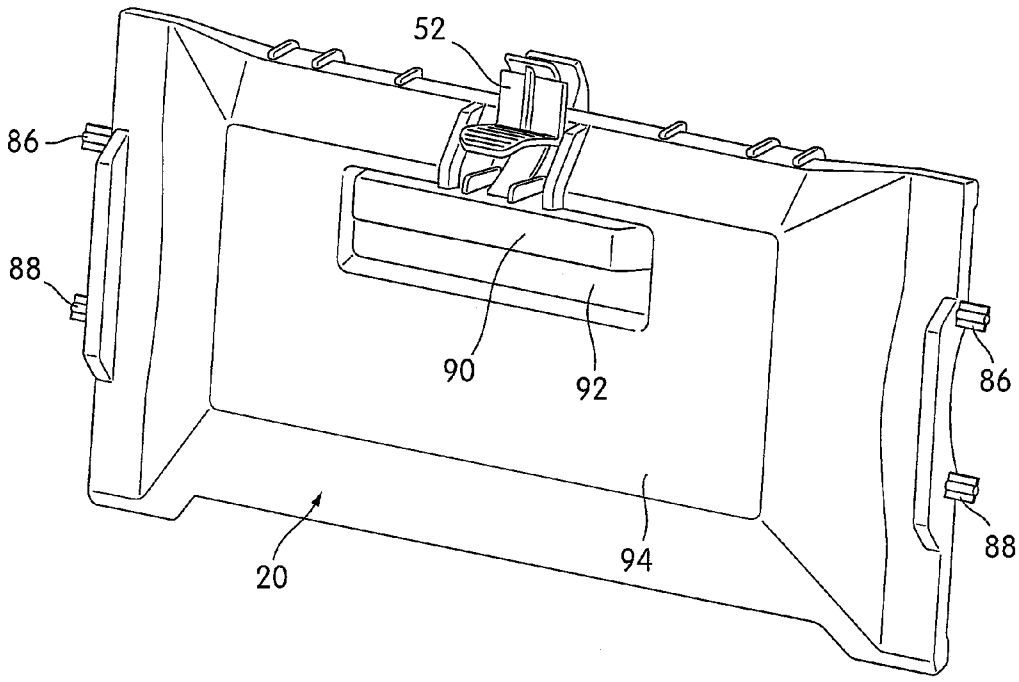
FIG. 3 is a perspective view of the slidable closure member in accordance with an embodiment of the present invention.
Figure 4:
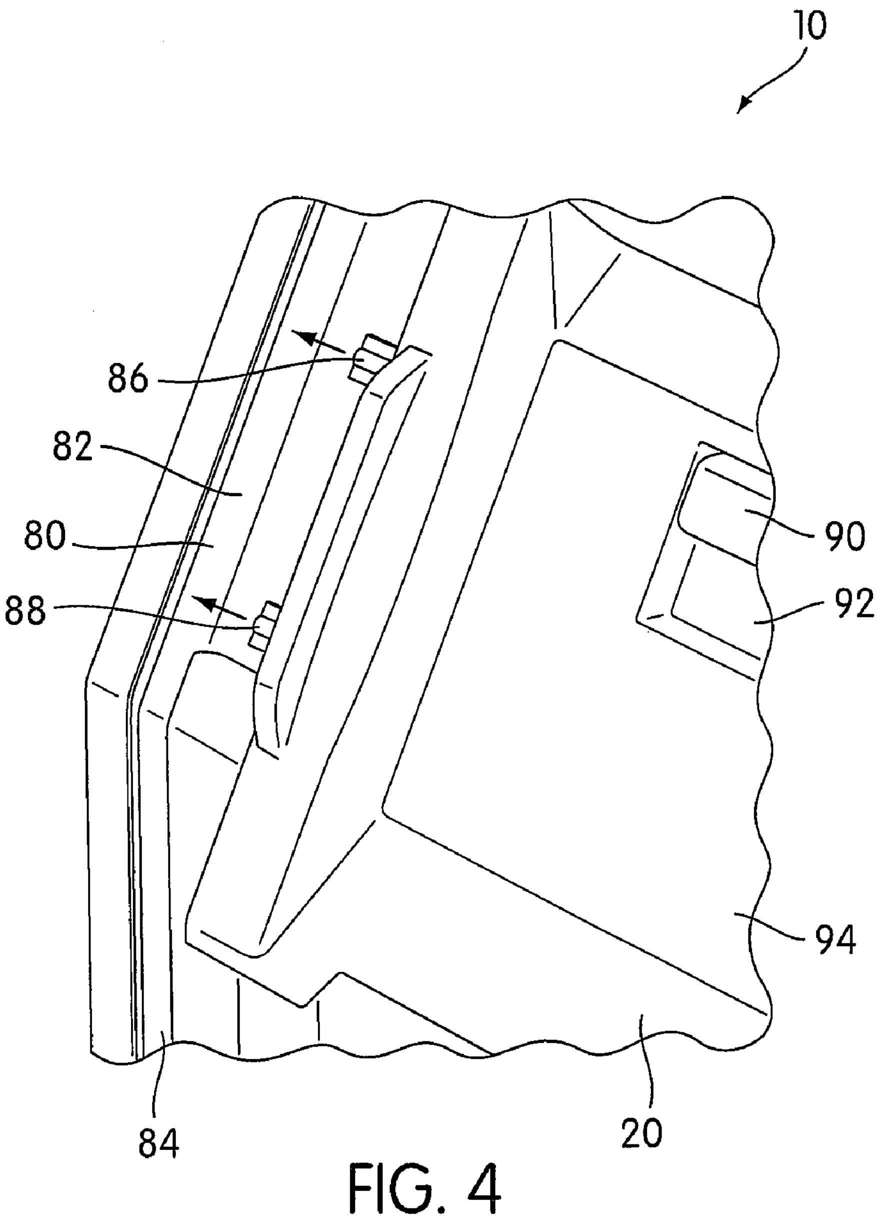
FIG. 4 is a partial perspective view of the slidable closure member with pins that slidably support the slidable closure member in a guide as the slidable closure member moves between the first position and the second position in accordance with an embodiment of the present invention.

FIGS. 3 and 4 show the slidable closure member 20, which may generally include at least two pair of pins 86 and 88 to slidably support the closure member 20 in the guide 80 as the closure member 20 slides between the first position (upper, closed position) and the second position (lower, open position).

As shown in FIG. 3, the slidable closure member 20 includes a handle 90 that allows the user to move the closure member 20 between the first position and the second position. The handle 90 is optionally formed above a recess 92 located on a front surface 94 of the slidable closure member 20. The latch member 52, which is used to secure the slidable closure member 20 in the first position, may be attached to the front surface 94 of the slidable closure member 20 as will be described with respect to FIGS. 10-15.

Figure 5:
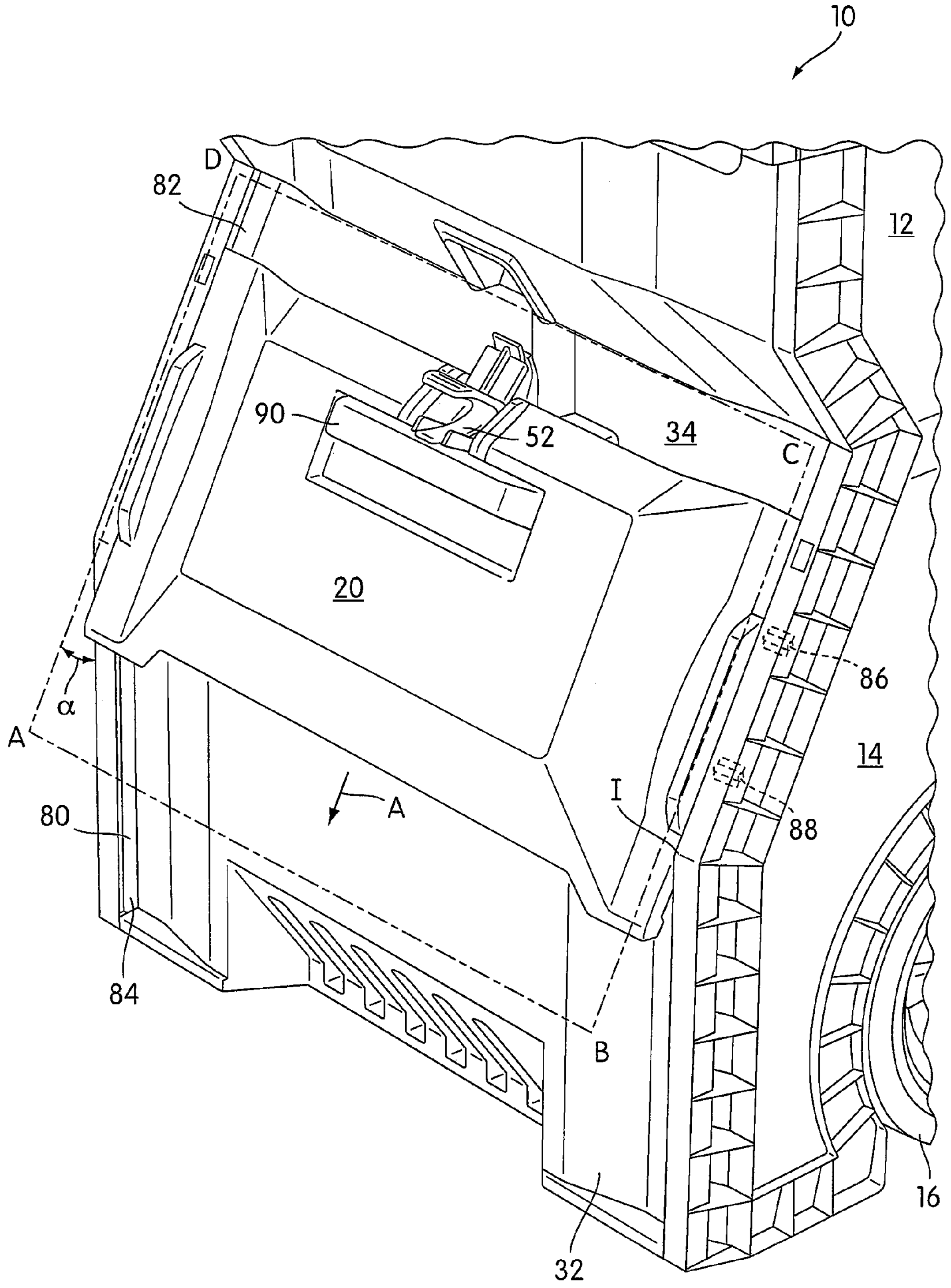
FIG. 5 is a perspective view of the tool container assembly, where the slidable closure member is being moved from the first position to the second position in accordance with an embodiment of the present invention.
Figure 6:
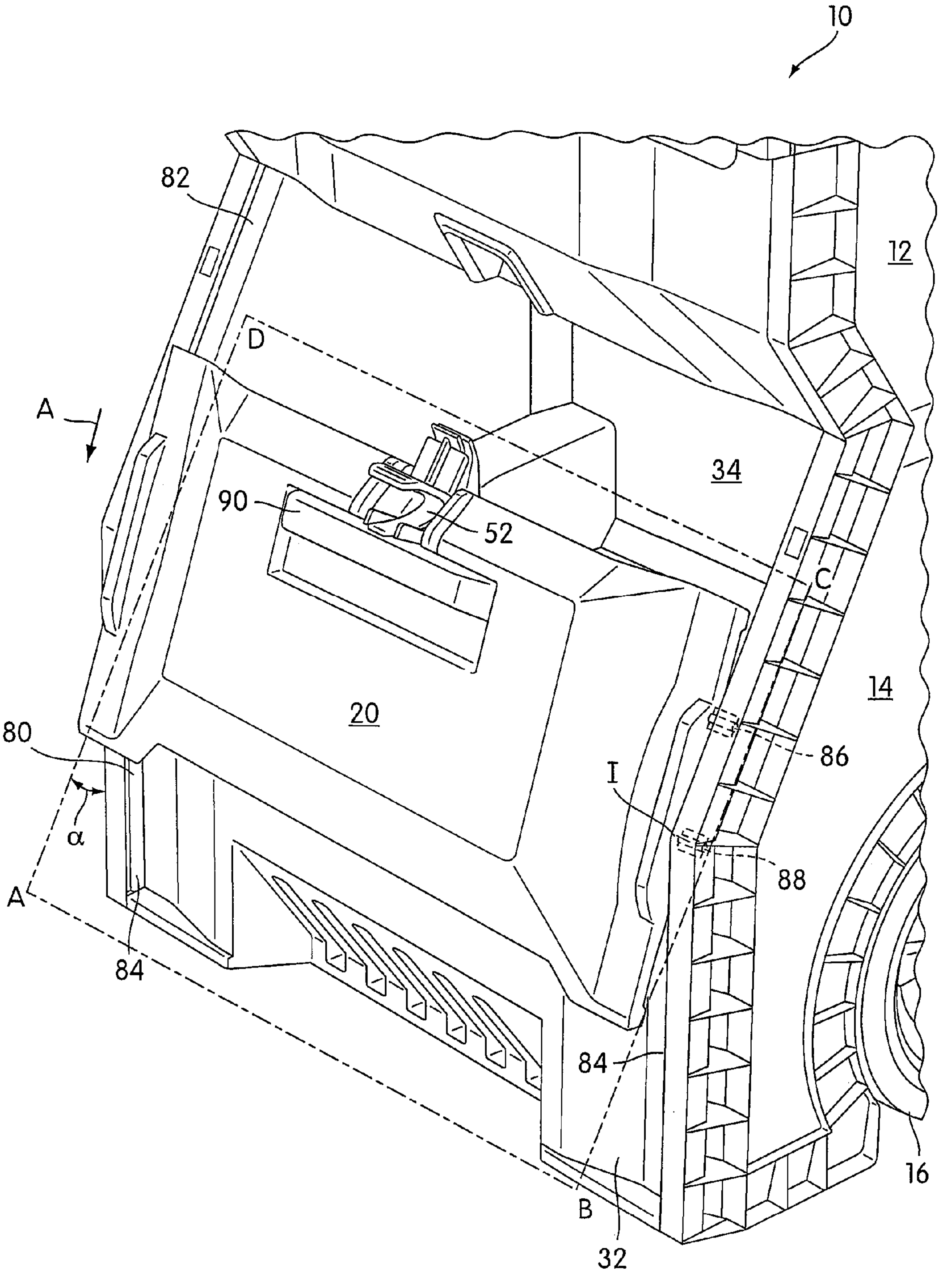
FIG. 6 is a perspective view of the tool container assembly, where the slidable closure member slidably movable from the first position to the second position in accordance with an embodiment of the present invention.

FIGS. 5-9 show the operation of the slidable closure member 20 as the closure member 20 slides from the first position down to the second position. After the latch member 52 of the closure member 20 is released from the latch receiver 54 (as shown in FIGS. 10-15) of the tool container assembly 10, the closure member 20 can be initially moved from the first position toward the second position in the direction of arrow A, as shown in FIGS. 5 and 6. In one embodiment, the user uses the handle 90 to move the closure member 20 in the direction of arrow A after the latch member 52 is released. In one embodiment, the closure member 20 generally lies within the plane ABCD when as the closure member 20 lies in the first position and is latched in covering relation to front opening 34. In another embodiment, the closure member 20 generally lies parallel to the plane ABCD, as the closure member 20 lies in the first position and is latched in covering relation to front opening 34. As used herein, the term "along the plane" refers to any structure or opening that lies generally within a plane, generally parallel to a plan or adjacent to a plane. When the closure member 20 is initially moved away from the first position towards the open (or second) position, it generally moves within or parallel to the plane ABCD, optionally with or without some articulation. Surfaces of the pins 86 and 88 of the closure member 20 are constructed and arranged to slidable engage with surfaces of the guide 80 so as to slidably move the closure member 20 from the first position toward the second position.

As the closure member 20 is move from the first position in the direction of the arrow A (e.g., generally within or parallel to plane ABCD), the closure member 20 eventually reaches a position, as shown in FIG. 6, where the lower pair of pins 88 of the closure member 20 is generally located at an intersection I between the plane ABCD and a plane along the lower front wall 32. When the closure member 20 is at this position, the closure member 20 begins to pivot about a pivot axis defined by upper pins 86 as the closure member 20 slides toward the second position. In one embodiment, the closure member 20 begins to pivot about the pivot axis after the forward pair of the pins 88 passes the intersection I between the plane ABCD and the plane generally along the lower front wall 32, and engages with second portions 84 of the guide 80.

Figure 7:
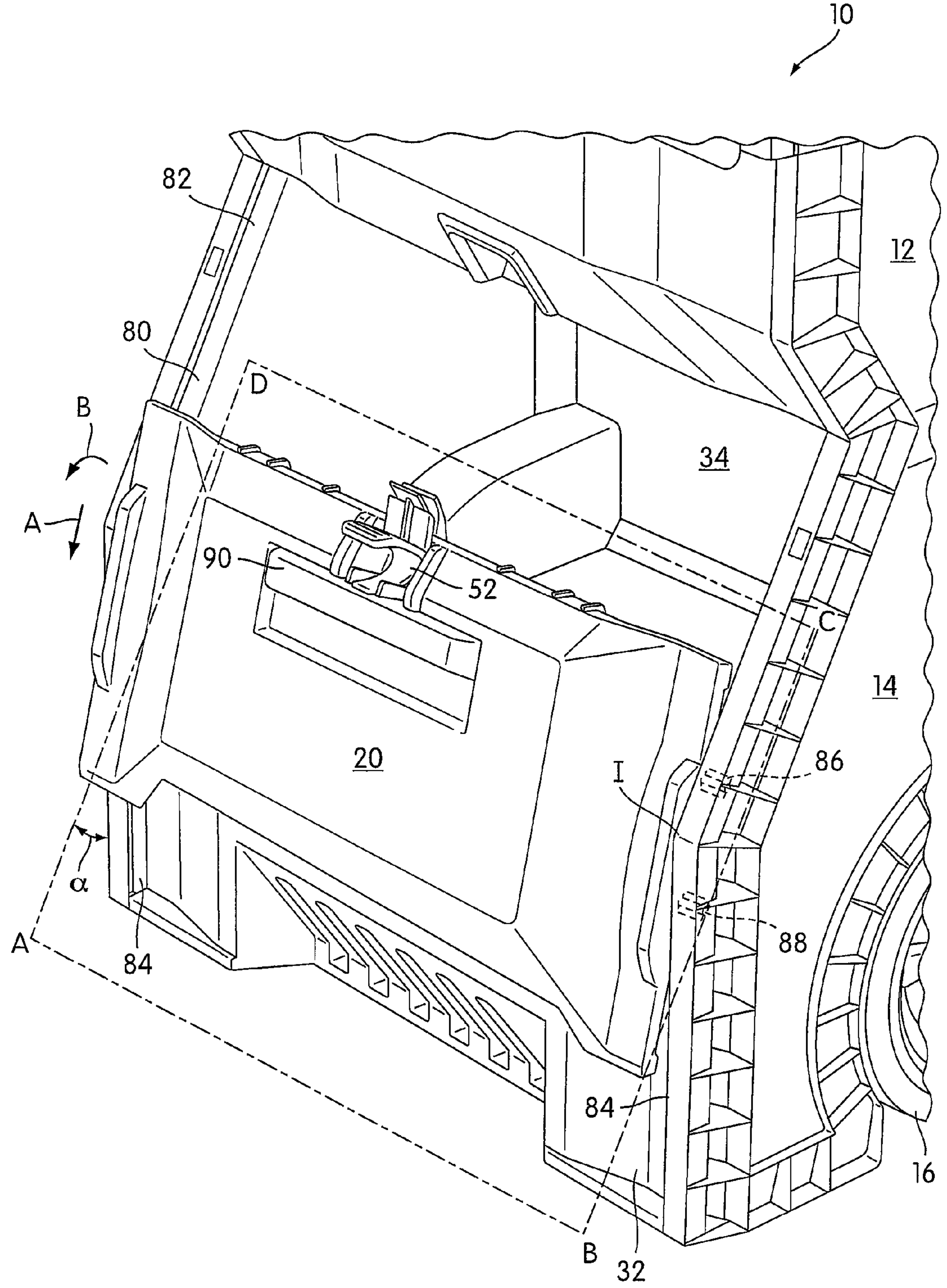
FIG. 7 is a perspective view of the tool container assembly, where the slidable closure member pivots about a pivot axis away from the plane as the closure member slides from the first position to the second position in accordance with an embodiment of the present invention.
Figure 8:
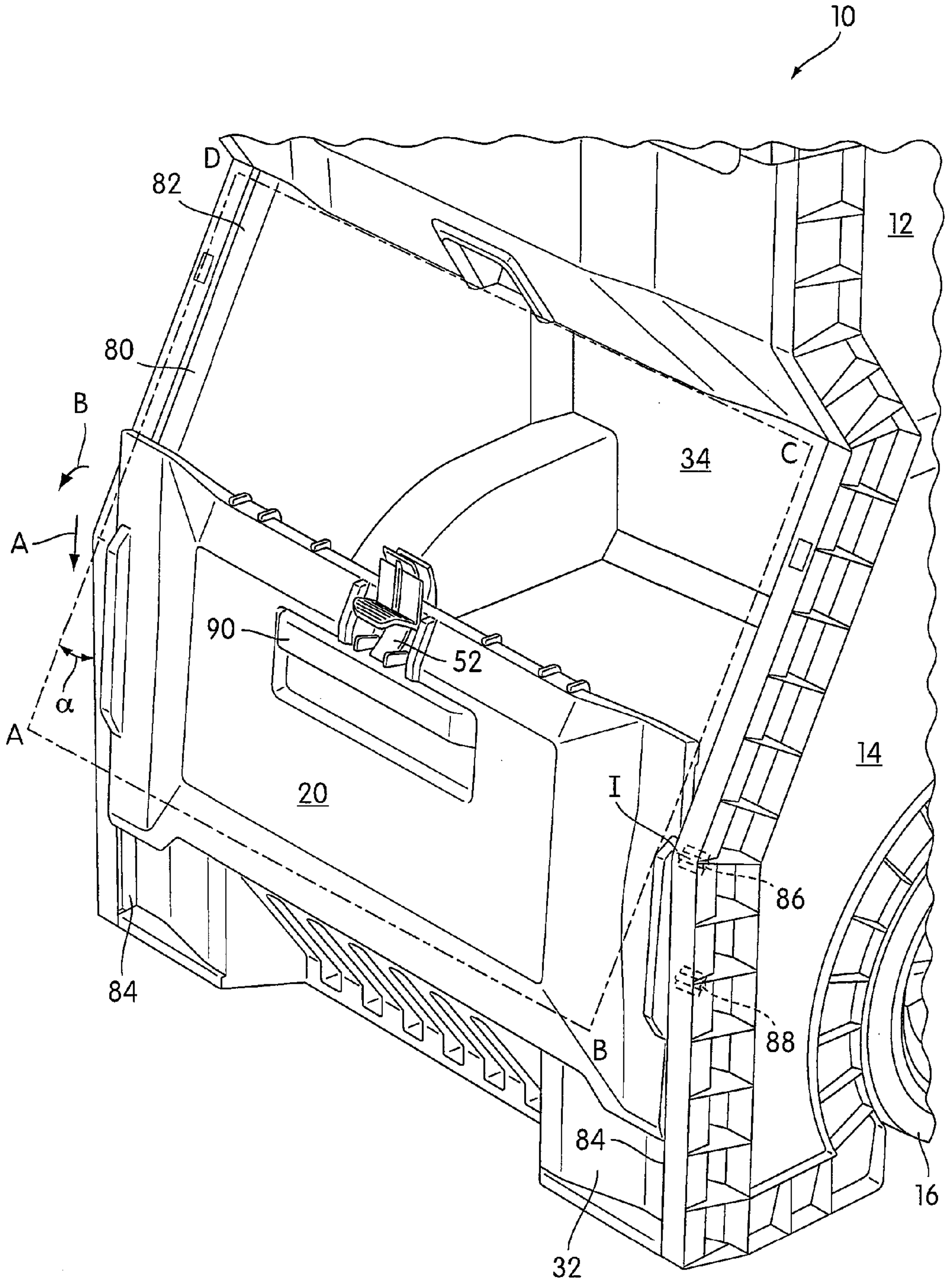
FIG. 8 is a perspective view of the tool container assembly, where the slidable closure member pivots about a pivot axis away from the plane as the closure member slides from the first position to the second position in accordance with an embodiment of the present invention.
Figure 9:
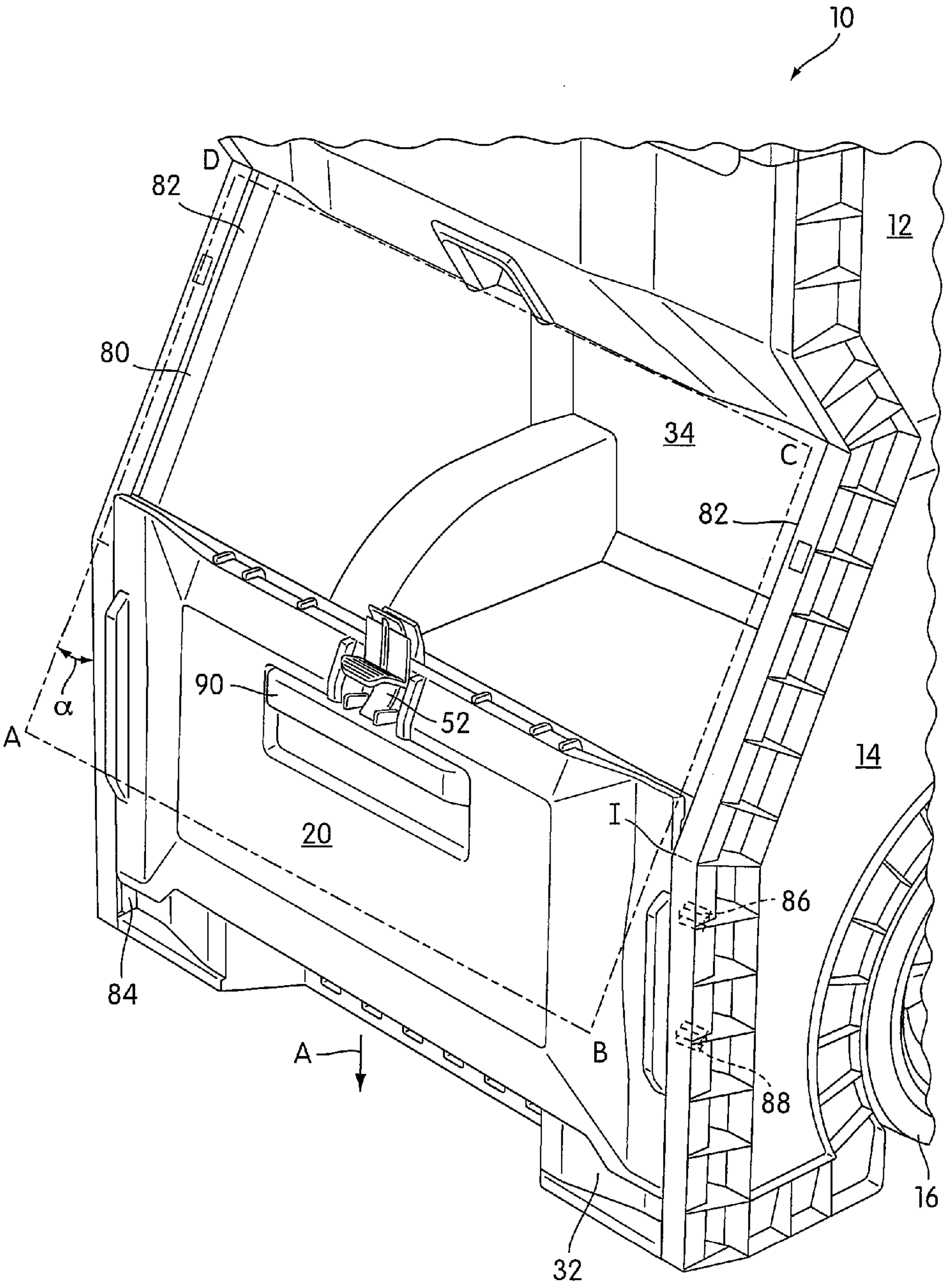
FIG. 9 is a perspective view of the tool container assembly, where the slidable closure member is slidably moved to the second position in accordance with an embodiment of the present invention.

FIGS. 7 and 8 show the closure member 20, where the closure member 20 is at position where the closure member 20 generally has been moved between the plane ABCD and the lower front wall 32. As shown in the FIGS. 7 and 8, the closure member 20 pivots in the direction of arrow B about the rearward pair of the pins 86 as the front pins 88 slide on the lower guide portions 84 and the closure member 20 slides to the second position in the direction of the arrow A. The closure member 20 continues to slidably move and pivot about the rearward pair of pins 86 until the rearward pair of pins 86 reaches the intersection I between the plane ABCD and the plane adjacent or parallel to lower front wall 32. It should be appreciated that the front pins 88 can also be considered to undergo pivoting and sliding movement, from its perspective, along guide portions 84. After the rearward pair of pins 86 passes the intersection I between the plane ABCD and that alongside (or along) the lower front wall 32, the closure member 20 may slidably move linearly via the pins 86 and 88 on the second portion 84 of the guide 80 (pivoting action discontinues) as shown in FIG. 9. In one embodiment, no linear movement exists after the pivotal movement. In other words, movement of closure member 20 may discontinue (e.g., via a stop structure) after a period of pivoting sliding movement to a fully open position. When the closure 20 is in the fully open position, it generally extends along a plane that is between the lower front wall 32 and the plane ABCD. The plane along which the closure 20 extends is disposed at an angle with respect to plane ABCD. In one embodiment, the plane along which closure 20 extends is generally parallel to the lower front wall 32.

The operation of the slidable closure member 20 as the closure member 20 slides from the second position to the first position is now explained. As the closure member 20 moves upwards from the second position, the closure member 20 reaches a position, where the pair of pins 86 of the closure member 20 is located at the intersection I between the plane ABCD and the plane along, alongside, or adjacent to the lower front wall 32. When the closure member 20 is at this position, the closure member 20 begins to pivot about a pivot axis as the closure member 20 slides from the second position to the first position. In one embodiment, forward pair of the pins 88 acts as the pivot axis after the pins 86 pass beyond intersection I, as the closure member 20 slides toward the first position. In one embodiment, the closure member 20 begins to pivot about the pivot axis after the rearward pair of the pins 86 passes the intersection I between the plane ABCD and the lower front wall 32 and engages with first portion 82 of the guide 80.

When the closure member 20 is at a position where the closure member 20 generally lies between the plane ABCD and the lower front wall 32, the closure member 20 pivots about the forward pair of the pins 88 as the closure member 20 slides toward the first position. The closure member 20 continues to slidably move and pivot about the forward pair of pins 88 until the forward pair of pins 88 reaches the intersection I between the plane ABCD and that alongside the lower front wall 32. After the forward pair of pins 88 passes the intersection I between the plane ABCD and the lower front wall 32, the closure member 20 slidably moves along the pins 86 and 88 on the first portion 82 of the guide 80. Once the closure member 20 substantially covers the front opening 34, the latch member 52 is engaged with the latch receiver 56 (as shown in FIGS. 10-15) to secure the closure member 20 in the first position.

Figure 10:
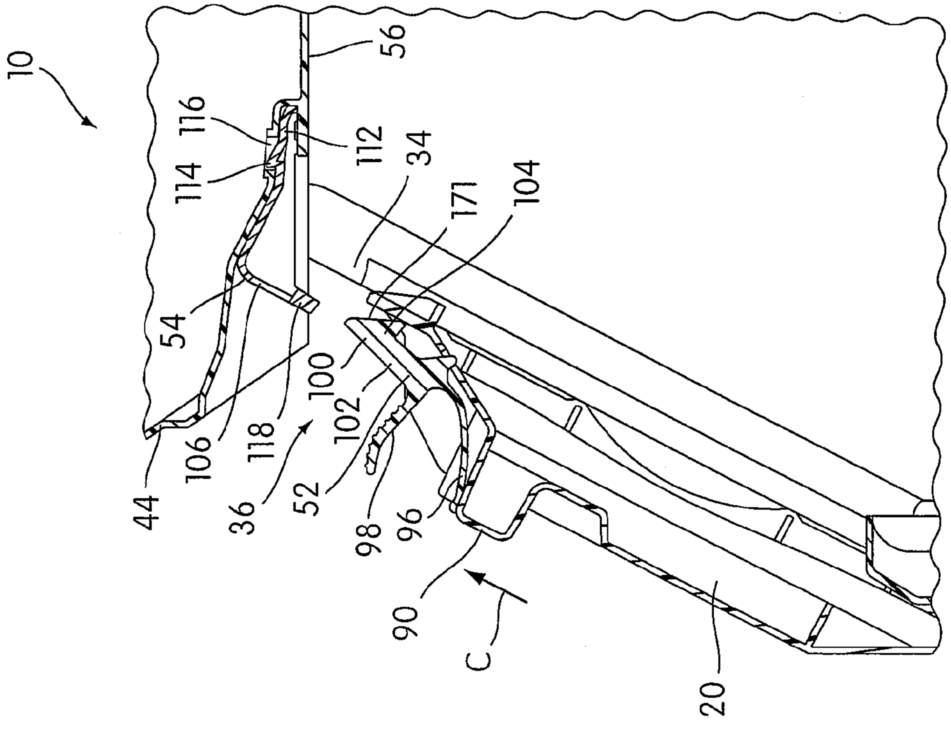
FIG. 10 is a cross-sectional view of a lock assembly, where a latch member attached to the slidable closure member engages with a latch receiver of the tool container assembly to lock the slidable closure member in the first position in accordance with an embodiment of the present invention.

FIGS. 10-15 show the operation of locking and unlocking the closure member 20, when the closure member 20 is in the first position. FIG. 10 is a cross-sectional view illustrating the lock assembly 36 that is constructed and arranged to lock the closure member 20 in the first position. The lock assembly 36 comprises the latch member 52 and the latch receiver 54. The latch member 52 is attached to the closure member 20 and the latch receiver 54 is attached to a portion of the tool container assembly 10 above the front opening 34. In one embodiment, the aforementioned portion of the tool container assembly 10 above the front opening 34 is the bottom wall 56 of the upper container 12. The latch member 52 is constructed and arranged to engage with the latch receiver 54 to lock the closure member 20 in the first position.

The latch member 52 includes a connector member 96, a manually engageable member 98, and an attachment member 100. The connector member 96 is constructed and arranged to connect the latch member 52 to the slidable closure member 20. In one embodiment, the connector member 96 is connected to the handle 90 of the slidable closure member 20. In one embodiment, the connector member 96 of the latch member 52 is attached to the slidable closure member 20 by any of several well known attachment mechanisms such as riveting, welding, bolting or any other fastening mechanism as would be appreciated by one skilled in the art. In another embodiment, the connector member 96 of the latch member 52 may be integrally formed with the slidable closure member 20 (e.g., they may be formed from a molded plastic material). In one embodiment, the connector operates as a spring to retain the latch member 52 in a latched configuration. For this purpose, the connector member 96 may be formed from a resilient plastic or form a spring metal, such as spring steel. The manually engageable member 98 of the latch member 52 allows the user to move the latch member 52 from a lock position to an unlock position. The manually engageable member 98 may also allow the user to move the latch member 52 from the unlock position to the lock position, although in another embodiment the latch member 52 automatically locks when the closure 20 reaches the closed position. The attachment member 100 includes a manually engageable cantilever lever 102 and a protrusion 104 that deflects so that the protrusion 104 engages with or snaps into a groove or a recess 106 in the latch receiver 54 optionally under the force of spring 96.

The latch receiver 54 includes the aforementioned groove or recess 106, and a connector member 112. The connector member 112 is constructed and arranged to connect the latch receiver 54 to the tool container assembly 10. In one embodiment, the connector member 112 is attached to the upper front wall 44 of the tool container assembly 10. In another embodiment, the connector member 112 is attached to the wall 56 of the tool container assembly 10. In one embodiment, the connector member 112 may include a protrusion 114 that is constructed and arranged to connect with a groove or recess 116 formed in the upper front wall 44 or the wall 56 of the tool container assembly 10. The protrusion 114 and the groove or recess 116 engage with one another to secure the latch receiver 54 to the tool container assembly 10. In one embodiment, the connector member 112 of the latch receiver 54 is attached to the tool container assembly 10 by any of several well known attachment mechanisms such as welding, bolting, riveting, or any other fastening mechanism as would be appreciated by one skilled in the art. In another embodiment, the connector member 112 of the latch receiver 54 may be integrally formed with the tool container assembly 10. The groove or recess 106 is constructed and arranged to receive the protrusion 104 of the latch member 52 to lock the slidable closure member 20. In one embodiment, the latch receiver 54 includes an engaging member 118 that is located below the groove or recess 106.

Figure 11:
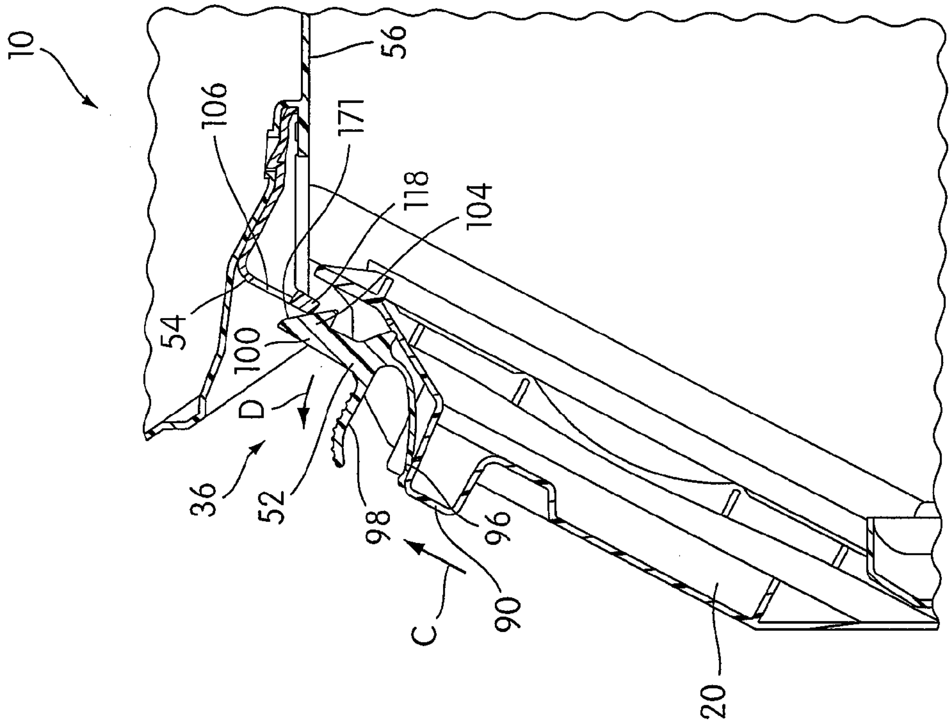
FIG. 11 is a cross-sectional view of the lock assembly, where the latch member moved to engage with the latch receiver in accordance with an embodiment of the present invention.
Figure 13:
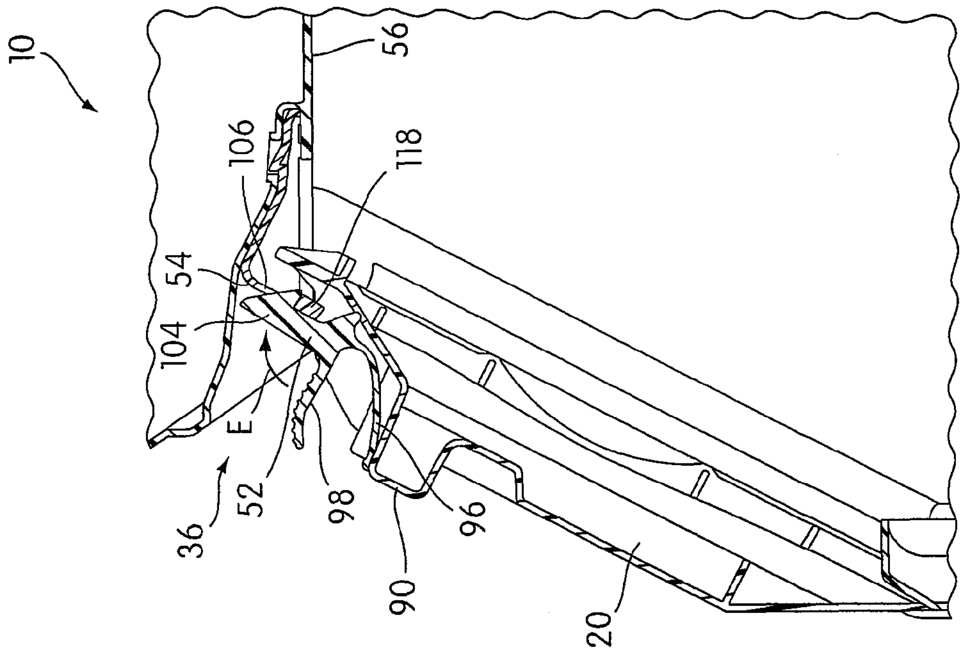
FIG. 13 is a cross-sectional view of the lock assembly, where the latch member is engaged with the latch receiver to lock the closure member in the first position in accordance with an embodiment of the present invention.
Figure 12:
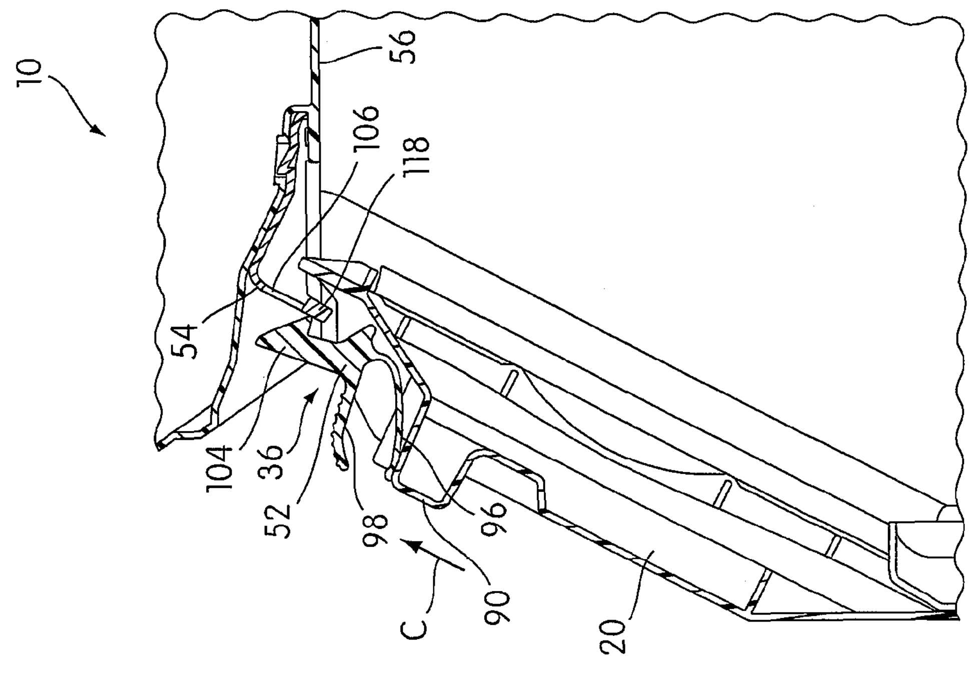
FIG. 12 is a cross-sectional view of the lock assembly, where the latch member rides over the latch receiver in accordance with an embodiment of the present invention.

FIGS. 11-13 show the operation to lock the slidable closure member 20 in the first position. As shown in FIG. 11, to lock the slidable closure member 20 in the first position, the manually engageable member 98 of the latch member 52 is depressed downwardly such that the protrusion 104 of the attachment member 100 moves outwardly in the direction of arrow D. In one embodiment, the latch member 52 is spring biased toward the latched position (clockwise in FIGS. 10-15). In such embodiment, the protrusion 104 has a cam surface 171 that engages the engaging member 118 when closure 20 is moved to the closed position. This engagement deflects the protrusion 104 in a counterclockwise direction, against the spring bias applied by the connector spring 96 in the clockwise direction, until the protrusion 104 reaches the recess, groove, or opening 106, whereupon the protrusion snaps into such recess, groove or opening 106 to latch the closure 20 in the closed position.

FIG. 12 shows the slidable closure member 20 being moved to the first (or closed) position in the direction of arrow C. As the slidable closure member 20 is moved to the first position, the protrusion 104 of the latch member 52 is shown riding over the engaging member 118 of the latch receiver 54 until the protrusion 104 of the latch member 52 engages with the groove or recess 106 located in the latch receiver 54 as shown in FIG. 13. The protrusion 104 moves inwardly in the direction of arrow E to engage with the recess or groove 106 of the latch receiver 54.

Figure 15:
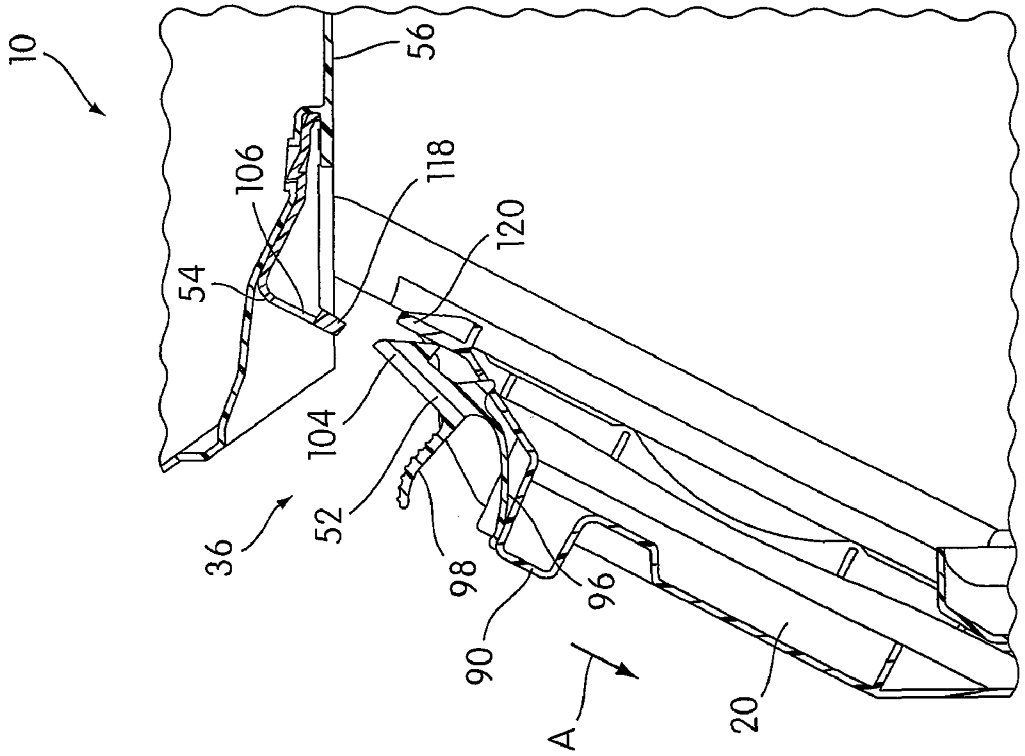
FIG. 15 is a cross-sectional view of the lock assembly, where the latch member is disengaged from the latch receiver to unlock the closure member in accordance with an embodiment of the present invention.
Figure 14:
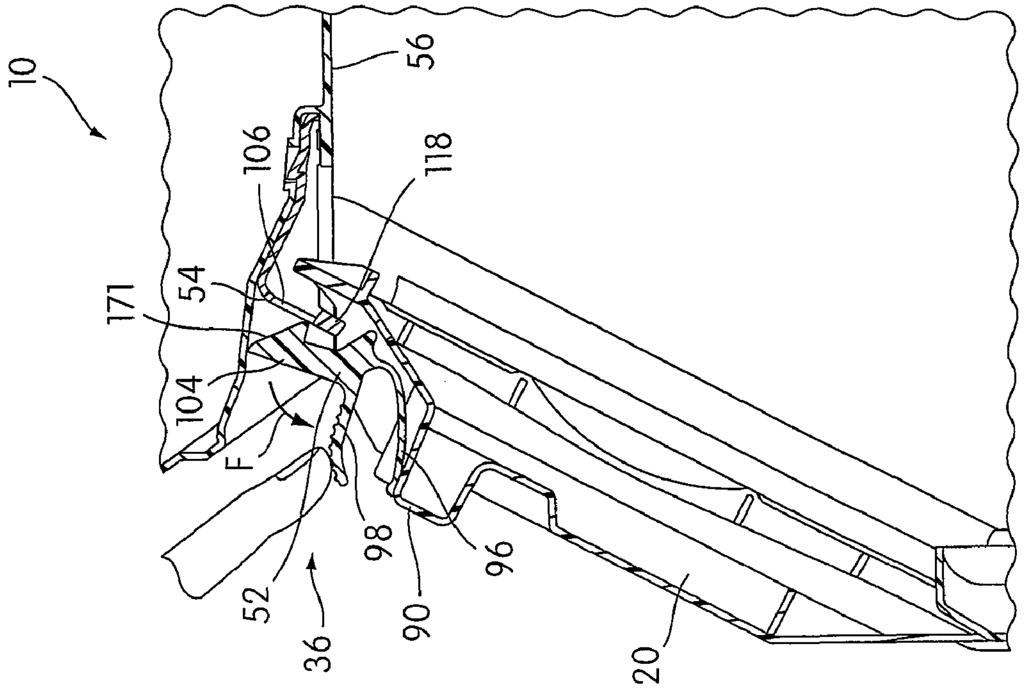
FIG. 14 is a cross-sectional view of the lock assembly, where the latch member is moved outwardly to disengage from the latch receiver to unlock the closure member in accordance with an embodiment of the present invention.

FIGS. 14 and 15 show the operation to unlock the slidable closure member 20 from the lock position. The manually engageable member 98 of the latch member 52 is depressed downwardly (against a spring bias of the connector spring 96) such that the protrusion 104 of the latch member 52 is moved outwardly in the direction of arrow F to release the protrusion 104 from the groove or recess 106 of the latch receiver 54. After the protrusion 104 of the latch member 52 is released from the groove or recess 106 of the latch receiver 54, the protrusion 104 of the latch member 52 rides over the engaging member 118 of the latch receiver 54 until the protrusion 104 of the latch member 52 engages with surface 120 of the slidable closure member 20 as shown in FIG. 15.

In another embodiment, rather than employing a closure 20 that slides and pivots as described, it is contemplated that a strictly pivoting closure or other type closure can be used. Thus, the orientation of the opening 34, irrespective of the closure used therefore, is another independent aspect of the invention.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A tool container assembly, the container assembly comprising:

an upper container having an upper storage space therein;

a lower container having a lower storage space therein, the lower container having a fixed rear wall, fixed opposing side walls, a fixed bottom wall, a fixed lower front wall, a fixed separating wall between the upper storage space and the lower storage space, and a front opening above the lower front wall, wherein the front opening generally lies along a plane that extends away from the rear wall as it extends downwardly;

rollers constructed and arranged to enable rolling transport of the tool container assembly;

a handle operatively connected to the tool container assembly to facilitate tilted rolling transport of the tool container assembly; and a slidable closure member slidably movable between a first position wherein it substantially covers the front opening and a second position wherein it exposes the front opening;

wherein the closure member moves to a position wherein it generally lies between the plane and the lower front wall, and at an angle with respect to the plane, when it is moved to the second position, and wherein when the closure member is in the second position exposing the front opening, and with the fixed separating wall disposed between the upper storage space and the lower storage space, unobstructed access to the lower container fixed bottom wall is permitted through the front opening that generally lies along the plane that extends away from the rear wall as it extends downwardly.

2. The container assembly of claim 1, wherein the closure member pivots about a pivot axis away from the plane as the closure member slides from the first and the second position.

3. The container assembly of claim 2, wherein the closure member comprises at least two pair of pins to slidably support the closure member in a guide as the closure member slides between the first position and the second position.

4. The container assembly of claim 3, wherein the rearward pair of the pins act as the pivot axis as the closure member slides from the first position to the second position, and the forward pair of pins act as the pivot axis as the closure member slides from the second position to the first position.

5. The container assembly of claim 3, wherein the guide is disposed generally along the opposing side walls of the lower container.

6. The container assembly of claim 1, wherein the closure member is generally parallel to the lower front wall of the lower container when the closure member is in the second position.

7. The container assembly of claim 1, wherein a lock assembly is constructed and arranged to lock the closure member in the first position.

8. The container assembly of claim 7, wherein the lock assembly comprises a latch member attached to the closure member and a latch receiver attached to a portion of the container assembly above the front opening.

9. The container assembly of claim 8, wherein the portion of the container assembly above the front opening is a base wall of the upper container.

10. The container assembly of claim 8, wherein the latch member is constructed and arranged to engage with the latch receiver to lock the closure member in the first position.

11. The container assembly of claim 1, wherein a recess formed in the side walls and the rear wall of the lower container is constructed and arranged to accommodate the rollers.

12. The container assembly of claim 1, wherein the handle is movable between a storage position and an extended position to facilitate tilted rolling transport of the tool container assembly.

13. The container assembly of claim 1, wherein the upper container comprises an upwardly facing opening into the upper storage space.

14. The container assembly of claim 13, wherein a cover is constructed and. arranged to be connected the upper container and movable between a closed position wherein it substantially covers the upwardly facing opening and a open position wherein it exposes the upwardly facing opening.

15. The container assembly of claim 13, wherein the upper container comprises a cover lock assembly constructed and arranged to lock the cover in the closed position.

16. The container assembly of claim 14, wherein the handle is constructed and arranged to fold down into a handle recess formed on surface of the cover.

17. The container assembly of claim 1, wherein the closure member generally lies within or parallel to the plane when in the first position.

18. A tool container assembly, the container assembly comprising:

a container having a storage space therein;

the container having a fixed rear wall, fixed opposing side walls, a fixed bottom wall, a fixed lower front wall, a fixed upper wall, and a front opening between the lower front wall and the fixed upper wall, wherein the front opening generally lies along a plane that extends away from the rear wall as it extends downwardly;

rollers constructed and arranged to enable rolling transport of the tool container assembly;

a handle operatively connected to the tool container assembly to facilitate tilted rolling transport of the tool container assembly; and a slidable closure member slidably movable between a first position wherein it substantially covers the front opening and a second position wherein it exposes the front opening;

wherein the closure member moves to a position wherein it generally lies between the plane and the lower front wall, and at an angle with respect to the plane, when it is moved to the second position, and wherein when the closure member is in the second position exposing the front opening, unobstructed access to the container fixed bottom wall is permitted through the front opening between the lower front wall and the fixed upper wall.

19. The container assembly of claim 18, wherein the storage space comprises an upper storage space and a lower storage space.

20. The container assembly of claim 18, wherein the container further comprises an upper front wall and an upwardly facing opening.

21. The container assembly of claim 18, wherein the closure member pivots about a pivot axis away from the plane as the closure member slides from the first and the second position.

22. The container assembly of claim 21, wherein the closure member comprises at least two pair of pins to slidably support the closure member in a guide as the closure member slides between the first position and the second position.

23. The container assembly of claim 22, wherein the rearward pair of the pins act as the pivot axis as the closure member slides from the first position to the second position, and the forward pair of pins act as the pivot axis as the closure member slides from the second position to the first position.

24. The container assembly of claim 23, wherein the guide is disposed generally along the opposing edges surrounding the front opening and opposing edges surrounding the lower front wall.

25. The container assembly of claim 18, wherein the closure member is generally parallel to the lower front wall when the closure member is in the second position.

26. The container assembly of claim 18, wherein a lock assembly is constructed and arranged to lock the closure member in the first position.

27. The container assembly of claim 26, wherein the lock assembly comprises a latch member attached to the closure member and a latch receiver attached to a portion of the container assembly above the front opening.

28. The container assembly of claim 27, wherein the latch member is constructed and arranged to engage with the latch receiver to lock the closure member in the first position.

29. The container assembly of claim 18, wherein a recess formed in the side walls and the rear wall of the container is constructed and arranged to accommodate the rollers.

30. The container assembly of claim 18, wherein the handle is movable between a storage position and an extended position to facilitate tilted rolling transport of the tool container assembly.

31. The container assembly of claim 20, wherein a cover is constructed and arranged to be movable between a closed position wherein it substantially covers the upwardly facing opening and a open position wherein it exposes the upwardly facing opening.

32. The container assembly of claim 31, wherein a cover lock assembly is constructed and arranged to lock the cover in the closed position.

33. The container assembly of claim 32, wherein the handle is constructed and arranged to fold down into a handle recess formed on surface of the cover.

34. The container assembly of claim 18, wherein the closure member generally lies within or parallel to the plane when in the first position.

35. A tool container assembly, the container assembly comprising:

an upper container having an upper storage space therein;

a lower container having a lower storage space therein, the lower container having a fixed rear wall, fixed opposing side walls, a fixed bottom wall, a fixed lower front wall, a fixed separating wall between the upper storage space and the lower storage space, and a front opening above the lower front wall, wherein the front opening generally lies along a plane that extends away from the rear wall as it extends downwardly;

rollers constructed and arranged to enable rolling transport of the tool container assembly; and a handle operatively connected to the tool container assembly to facilitate tilted rolling transport of the tool container assembly, wherein, with the fixed separating wall disposed between the upper storage space and the lower storage space, unobstructed access to the lower container fixed bottom wall is permitted through the front opening that generally lies along the plane that extends away from the rear wall as it extends downwardly.

* * * * *